(Model.)
C. HINZ.
Sash Fastener.
No. 241,860. Patented May 24, 1881.
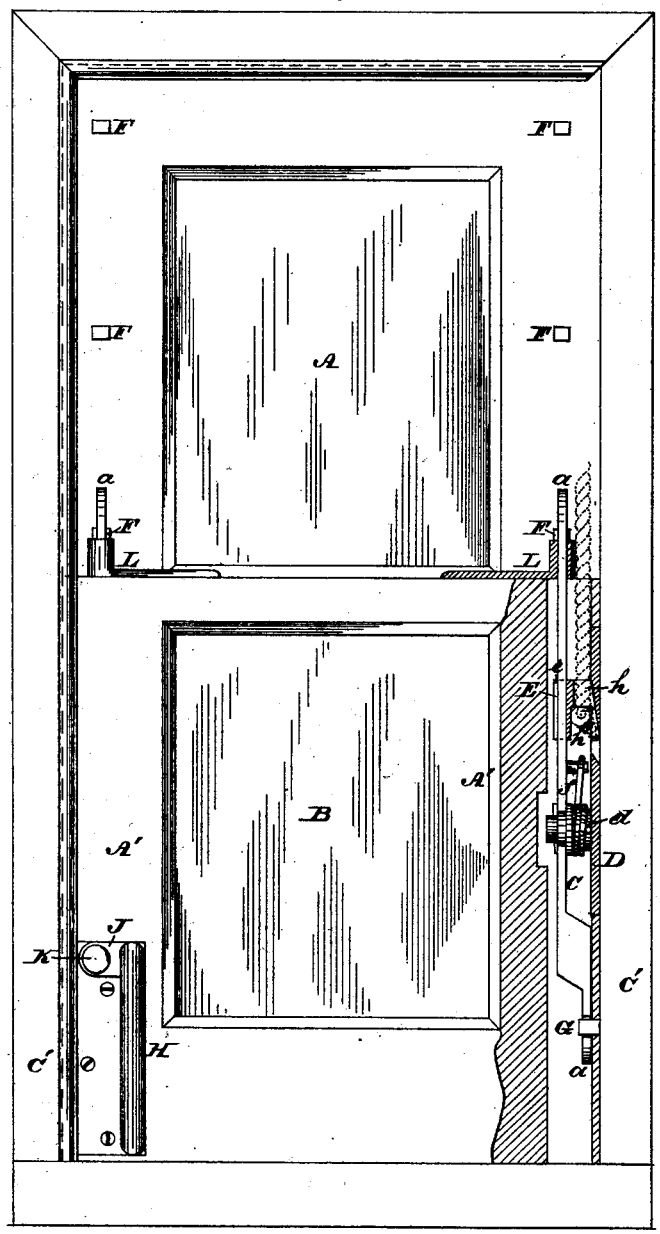
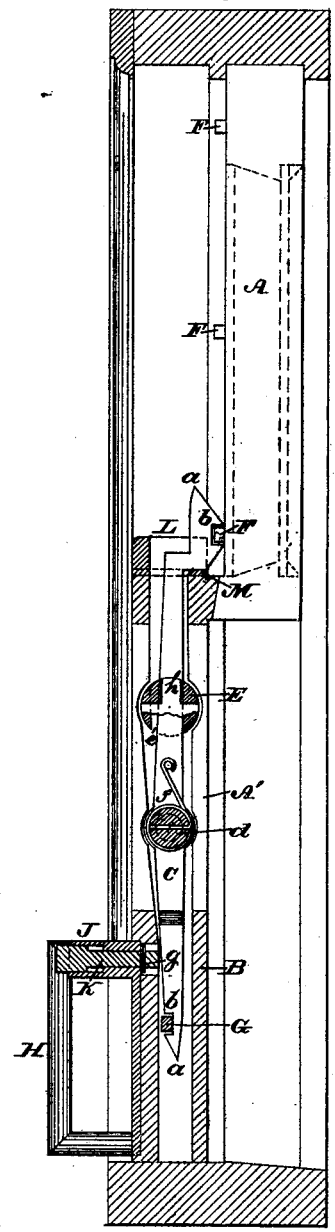
Witnesses:
A. P. Grant,
W. F. Kircher
Inventor:
Carl Hinz,
by John A. Diebershein,
ATTORNEY.

UNITED STATES PATENT OFFICE.

CARL HINZ, OF PHILADELPHIA, PENNSYLVANIA.

SASH-FASTENER.

SPECIFICATION forming part of Letters Patent No. 241,860, dated May 24, 1881.

Application filed March 22, 1881. (Model.)

*To all whom it may concern:*

Be it known that I, CARL HINZ, a citizen of the United States, formerly of San Francisco, California, now residing in the city and county of Philadelphia, State of Pennsylvania, have invented a new and useful Improvement in a Device for Locking, Holding, and Operating Sashes, which improvement is fully set forth in the following specification and accompanying drawings, in which—

Figure 1 is a front view, partly broken away, of sashes having my invention applied to them. Fig. 2 is a partial side elevation and vertical section thereof.

Similar letters of reference indicate corresponding parts in the two figures.

My invention consists of improved means for locking, holding, and operating sashes, as will be hereinafter fully set forth and definitely claimed.

Referring to the drawings, A and B represent the upper and lower sashes of a window.

The side rails, A', of the lower sash are grooved or cut out vertically to form chambers, in each of which is fitted an upright dog, C, having a nose, $a$, and notch $b$ at each end, said dog being pivoted to a stud, $d$, projecting horizontally inward from a face-plate, D, which is secured to the outer end of the rail.

Projecting horizontally inward from near the upper end of the plate D is a head, E, having a vertical groove, $e$, in which plays and is guided the dog C, and its walls act as stops for limiting said play of the dog.

A spring, $f$, is secured to a proper part of the plate D and presses against the dog, the normal position of the dog being shown in Fig. 2.

The upper notch, $b$, of the dog is adapted to engage with one of the lugs F, projecting forward from the upper sash, A, and arranged one above the other, and the lower notch, $b$, to engage with a lug, G, projecting inwardly from the side rail of the window-frame C', near the bottom thereof.

On each side of the lower sash, at the bottom thereof, is secured a handle, H, and adjacent thereto is a guiding-piece, J, cast with a lateral extension of the handle, through which piece is fitted a transversely-extending plunger, K, the inner end of which, passing through the side rail, abuts against the lower portion of the dog C, displacement of the plunger being prevented by a stop shoulder or pin, as at $g$, on its inner end.

Secured to the sides of the top of the meeting-rail of the lower sash are upwardly-projecting slotted or open plates L, through which the dogs C are passed, and each dog is formed at its upper end, below the notch $b$, with a shoulder, M, which abuts against the base of the plate L when the parts are in their normal position, the transverse direction of the openings or slots of the plates L being sufficient to permit play of the dogs when moved for locking or unlocking purposes.

When the two sashes are properly closed each dog engages with one of the lugs F of the upper sash, and also with the lug G of the window-frame, whereby both sashes are locked and cannot be opened from the outside. Should attempts be made to force down the upper sash the shoulders M, abutting against the plates L, receive the strain, and thus the dogs cannot be broken down from their pivots. In order, however, to properly open the sashes from the inside the handles H are grasped and the thumbs pressed against the plungers K, whereby the dogs C are forced back from the lugs G at the bottom and lugs F at the top. The sash can then be raised or lowered by the handles with convenience, and without engagement of the dogs with the lugs of the upper sashes. When the sash is again fully lowered and the plungers are let go, the dogs, under action of the springs $f$, return to their normal positions and again engage with the lugs F G.

When the lower sash is to be partially raised and so remain the handles and plungers are operated as before, and when the proper height is obtained the lugs engage with the middle or upper series of lugs of the upper sash, both sashes being locked together. In this position of parts the upper sash may also be lowered by drawing down the lower sash, and when to full extent the dogs drop into the lugs G and lock both sashes, this feature being serviceable for ventilating with the upper sash, the latter being locked, as stated, and immovable, except by proper operation of the plungers.

The upper sash may at any time be lowered by the lower sash simply by pressing in the plungers K, raising the lower sash, letting go the plungers, and when the dogs reach the middle series of lugs F they engage therewith; then draw down the lower sash and the upper sash follows it; again press in the plungers, raise the lower sash, let go the plungers, and when the dogs take hold of the top series of lugs F of the upper sash draw down the lower sash and the upper sash is farther lowered. The upper sash need not be lowered to full extent, whereby, when the dogs are released from the lugs G and the lower sash is slightly raised the dogs may engage with the top series of lugs F, and so the upper sash may be entirely raised by the lower sash.

In the portion of each guiding and stop head E, between the plate D and dog C, is a vertical opening, $h$, for the sash-cord. The knot of the cord, after being passed through an opening in the plate D, abuts against the head E in the cut-away space $h'$, below said opening $h$, and is thus inclosed and protected from rubbing.

It is evident that the number of lugs F on the sash may be duplicated or multiplied as desired, as will be found especially serviceable in long and heavy sashes.

Having thus described my invention, what I claim as new, and desire to secure by Letters Patent, is—

1. The dogs C, with notches at both ends and pivoted to the lower sash, in combination with the upper sash and window-frame, provided, respectively, with the lugs F G, substantially as and for the purpose set forth.

2. The dogs with shoulders M and the abutment-plates L, combined and operating substantially as and for the purpose set forth.

3. The lower sash provided with the transverse plungers K, in combination with the dogs, substantially as and for the purpose set forth.

4. The handles H, with guiding-pieces J, and the plungers K, connected to the lower sash, in combination with the locking-dogs, substantially as and for the purpose set forth.

5. The combination, with the dogs, of the guiding and stop heads E, formed with vertical openings $h$ and cut-away portion $h'$, substantially as and for the purpose set forth.

CARL HINZ.

Witnesses:
JOHN A. WIEDERSHEIM,
W. F. KIRCHER.